(12) United States Patent
Vogel

(10) Patent No.: US 7,950,291 B2
(45) Date of Patent: May 31, 2011

(54) INSTRUMENT HOUSING

(75) Inventor: Timothy A. Vogel, Independence, MO (US)

(73) Assignee: Ruskin Company, Grandview, MO (US)

( * ) Notice: Subject to any disclaimer, the term of this patent is extended or adjusted under 35 U.S.C. 154(b) by 207 days.

(21) Appl. No.: 12/455,917

(22) Filed: Jun. 9, 2009

(65) Prior Publication Data

US 2010/0306964 A1 Dec. 9, 2010

(51) Int. Cl.
*G01L 1/00* (2006.01)
(52) U.S. Cl. .......................................... 73/855; 73/760
(58) Field of Classification Search ............. 73/856–860
See application file for complete search history.

(56) References Cited

U.S. PATENT DOCUMENTS

| | | | | |
|---|---|---|---|---|
| 4,640,061 A * | 2/1987 | Trumley | ............................ | 52/71 |
| 5,833,202 A * | 11/1998 | Wolfgang | ..................... | 248/466 |
| 6,468,128 B1 * | 10/2002 | Bala et al. | ...................... | 446/470 |
| 6,513,876 B1 * | 2/2003 | Agler et al. | ............... | 297/378.14 |
| 6,672,152 B2 | 1/2004 | Rouse et al. | ................ | 73/170.02 |
| 7,056,013 B2 | 6/2006 | Anderson et al. | ............. | 374/138 |
| 7,214,243 B2 * | 5/2007 | Taylor | ......................... | 623/17.11 |
| 7,223,133 B2 * | 5/2007 | Conn et al. | ..................... | 439/783 |
| 7,712,761 B2 * | 5/2010 | Mater et al. | .................... | 280/474 |
| 7,810,205 B2 * | 10/2010 | Park | .......................... | 15/250.201 |
| 2006/0148334 A1 * | 7/2006 | Conn et al. | ..................... | 439/783 |

* cited by examiner

*Primary Examiner* — Max Noori
(74) *Attorney, Agent, or Firm* — J. A. Thurnau, Esq.; T. A. Dougherty, Esq.; P. N. Dunlap, Esq.

(57) ABSTRACT

An instrument housing comprising a first portion having a wedge form, a third portion having a wedge form, a second portion between the first portion and the third portion, a first hinge portion between the first portion and the second portion, the first hinge portion extending normal to a major axis A-A, a second hinge portion between the second portion and the third portion, the second hinge portion extending normal to a major axis A-A, and the second portion having a portion for receiving an instrument.

20 Claims, 2 Drawing Sheets

INSTRUMENT HOUSING

FIELD OF THE INVENTION

The invention relates to an instrument housing comprising a first portion having a wedge form, a third portion having a wedge form, a second portion between the first portion and the third portion, a first hinge portion between the first portion and the second portion, the first hinge portion extending normal to a major axis A-A, a second hinge portion between the second portion and the third portion, the second hinge portion extending normal to a major axis A-A, and the second portion having a portion for receiving an instrument.

BACKGROUND OF THE INVENTION

Air flow detection and measurement is a necessary and desirable function of most systems that involve movement of air and other gases. This includes detection for the purposes of measurement and control.

Measurement generally requires the detector or other instrument to be in direct contact with the moving air or gas. Impingement of the air or gas on a detector or instrument will disrupt the flow and may adversely affect the measurement.

Representative of the art is U.S. Pat. No. 6,672,152 which discloses an air data sensor for an aircraft has a flush mounted plate at the outside surface of the aircraft and a housing for the sensor within the aircraft below the plate. A plurality of holes in the plate provide air flow to a pressure sensor in the housing. To prevent water from reaching the sensor, a trap chamber is provided below the holes. Various contorted air flow paths are disclosed. The tube to the pressure sensor may be heated.

What is needed is an instrument housing comprising a first portion having a wedge form, a third portion having a wedge form, a second portion between the first portion and the third portion, a first hinge portion between the first portion and the second portion, the first hinge portion extending normal to a major axis A-A, a second hinge portion between the second portion and the third portion, the second hinge portion extending normal to a major axis A-A, and the second portion having a portion for receiving an instrument.

SUMMARY OF THE INVENTION

The primary aspect of the invention is to provide an instrument housing comprising a first portion having a wedge form, a third portion having a wedge form, a second portion between the first portion and the third portion, a first hinge portion between the first portion and the second portion, a second hinge portion between the second portion and the third portion, and the second portion having a portion for receiving an instrument.

Other aspects of the invention will be pointed out or made obvious by the following description of the invention and the accompanying drawings.

The invention comprises an instrument housing comprising a first portion having a wedge form, a third portion having a wedge form, a second portion between the first portion and the third portion, a first hinge portion between the first portion and the second portion, the first hinge portion extending normal to a major axis A-A, a second hinge portion between the second portion and the third portion, the second hinge portion extending normal to a major axis A-A, and the second portion having a portion for receiving an instrument.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
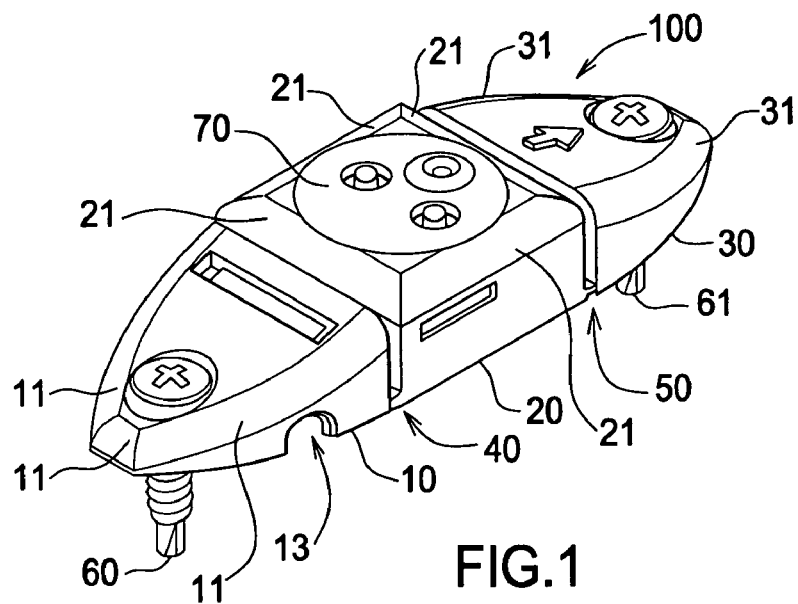
FIG. 1 is a perspective view of the housing.

FIG. 1 is a perspective view of the housing. Housing 100 comprises a first portion 10, a second portion 20, and a third portion 30. Hinge portion 40 connects portion 10 to portion 20. Hinge portion 50 connects portion 20 to portion 30. Each hinge portion 40 and 50 extends normal to a major axis A-A.

Fastener 60 attaches portion 10 to a mounting surface. Fastener 61 attaches portion 30 to a mounting surface.

Chamfered edges 11, 21 and 31 each improve the aerodynamic efficiency of the respective portions. Chamfered edges 11 and 21 are disposed to engage an air flow so as to smooth the air flow over the housing. Chamfered edges 21 smooth air flow over portion 20, which improves air flow past instruments 70.

Instrument cluster 70 mounts within portion 20. Instrument cluster 70 comprises a device or devices used to sense air flow past the housing. For example, a thermistor pair may be used, as well as other instruments known in the art.

Surface mount wiring can be installed through opening 13.

Figure 2:
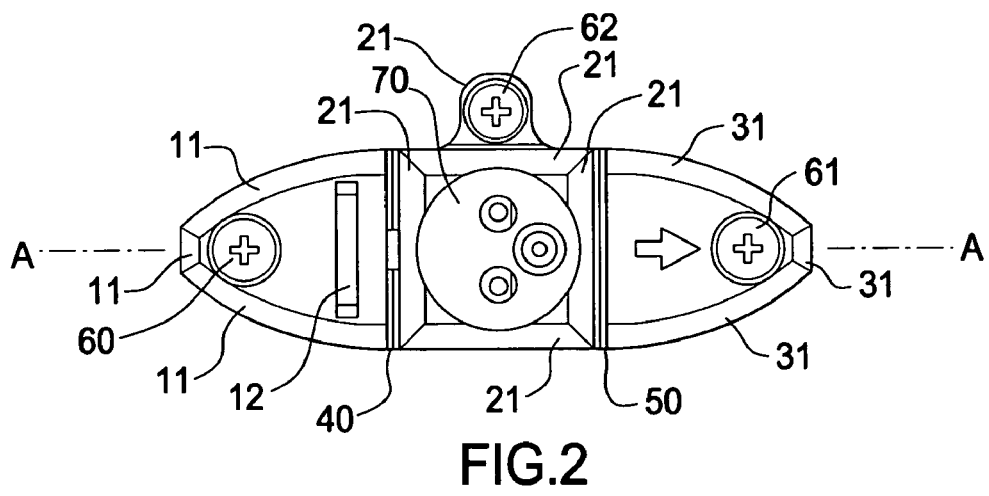
FIG. 2 is a top view of the housing.

FIG. 2 is a top view of the housing. The arrow on portion 30 points in the direction of an impinging air or gas flow. The housing is installed with major axis A-A parallel to an impinging air or gas flow direction.

Fastener 62 attaches portion 20 to a mounting surface. The low profile of fastener 62 and tab 22 has minimal effect on air or gas flow. Slot 12 can be used to receive a tie strap for securing wiring connected to an instrument cluster.

Figure 3:
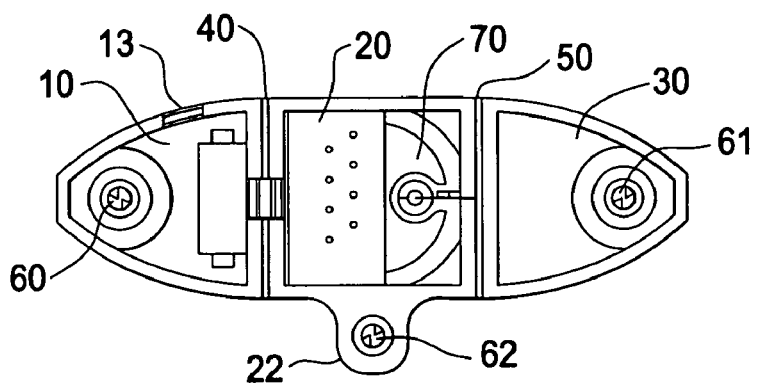
FIG. 3 is a bottom view of the housing.

FIG. 3 is a bottom view of the housing. Fastener 62 engages tab 22.

Figure 4:
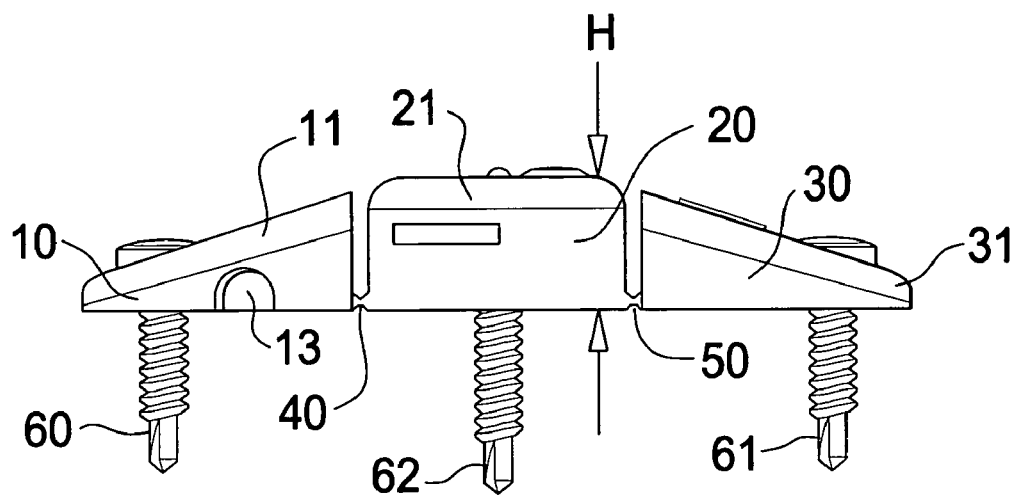
FIG. 4 is a side view of the housing.

FIG. 4 is a side view of the housing. Each hinge 40, 50 is flexible so the housing can be formed to fit a curved surface, such as a fan inlet bell or other curved surface. Portions 10, 20 pivot along hinge 40. Portions 20, 30 pivot along hinge 50. The ability to conform the housing to a curved or other complex surface increases its aerodynamic efficiency and thereby improves the accuracy of measurements by instruments 70. Further, a clean aerodynamic shape reduces the tendency of the housing to otherwise reduce fan or air flow efficiency.

In an alternate embodiment, each hinge portion 40, 50 may also simply comprise a flexible region disposed between each portion so that the first portion 10 and the second portion 20 is flexibly moveable with respect to each other. This allows the housing to conform to a surface, for example an arcuate surface. Likewise, the second portion 20 and the third portion 30 are flexibly moveable with respect to each other so as to allow the housing to conform to a surface, for example an arcuate surface. This may be achieved by using a low durometer ABS plastic for the housing which can be flexed or molded along hinges 40, 50 to conform to a desired mounting surface shape, for example a fan inlet bell.

In yet another alternate embodiment, the portion 30 may be omitted so the housing comprises on portion 10 and portion 20 with a connecting flexible hinge portion 40.

Figure 5:
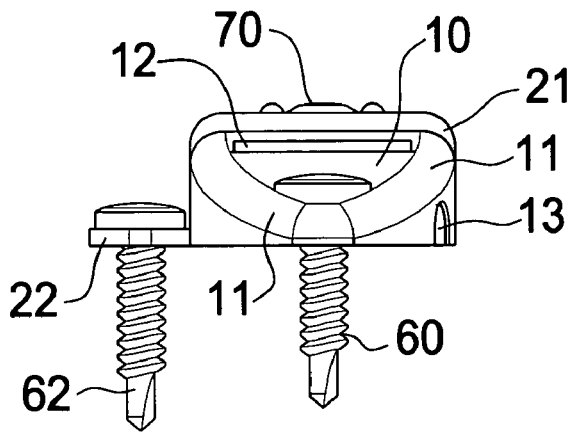
FIG. 5 is a front view of the housing.

FIG. 5 is a front view of the housing. The wedge-like form of portion 10 enhances aerodynamic efficiency of the housing. Portion 10 progressively increases in width W (viewed in plan, see FIG. 2) and progressively increases in height H (viewed in elevation, see FIG. 4) in a direction toward portion 20. The aerodynamic from in turn improves the accuracy of measurements taken by a sensor in instrument cluster 70.

Portion 20 has a substantially cube-like form for ease of manufacture and use, although a rectangular box-like form would be equally successful, for example, in the case of a large number of instruments 70 in portion 20. Namely, a height and width and length between hinges 40, 50 are not necessarily equal in length.

Figure 6:
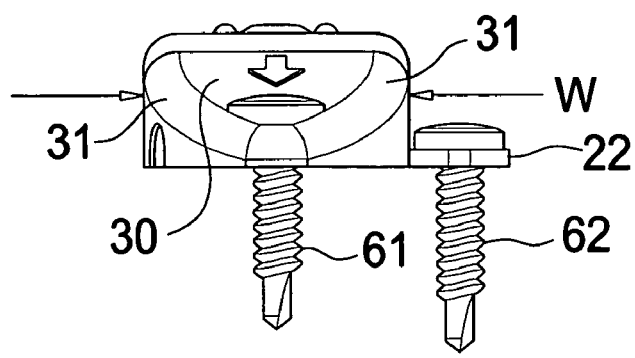
FIG. 6 is a rear view of the housing.

FIG. 6 is a rear view of the housing. The wedge-like form of portion 30 enhances aerodynamic efficiency of the housing. Portion 30 increases in width (viewed in plan, see FIG. 2) and height (viewed in elevation, see FIG. 4) in a direction toward portion 20. The maximum width and height of each portion 10, 30 are each at a location that is immediately adjacent to portion 20. The cross-sectional width (W) and height (H) of portion 20 substantially matches the maximum width and height of each portion 10, 30. This in turn improves the accuracy of measurements taken by a sensor in instrument cluster 70 by enhancing aerodynamic efficiency.

Although a form of the invention has been described herein, it will be obvious to those skilled in the art that variations may be made in the construction and relation of parts without departing from the spirit and scope of the invention described herein.

I claim:

1. An instrument housing comprising;
a first portion (10) having a wedge-like form;
a third portion (30) having a wedge-like form;
a second portion (20) between the first portion and the third portion;
a first hinge portion (40) between the first portion and the second portion, the first hinge portion extending normal to a major axis A-A;
a second hinge portion (50) between the second portion and the third portion, the second hinge portion extending normal to a major axis A-A; and
the second portion for receiving an instrument (70).

2. The instrument housing as in claim 1, wherein the first portion and second portion each comprise a chamfered edge.

3. The instrument housing as in claim 1, wherein the second portion comprises a chamfered edge.

4. The instrument housing as in claim 1, wherein the second portion comprises a portion for receiving a fastener.

5. The instrument housing as in claim 1, wherein the first portion comprises a portion for receiving a fastener.

6. The instrument housing as in claim 1, wherein the third portion comprises a portion for receiving a fastener.

7. The instrument housing as in claim 1, wherein the second portion comprises a substantially cube-like form.

8. An instrument housing comprising;
a first portion having a wedge-like form;
a third portion having a wedge-like form;
a second portion between the first portion and the third portion;
the first portion and the second portion flexibly moveable with respect to each other so as to confirm to an surface;
the second portion and the third portion flexibly moveable with respect to each other so as to conform to a surface; and
the second portion having a portion for receiving an instrument.

9. The instrument housing as in claim 8, wherein the first portion and second portion each comprise a chamfered edge.

10. The instrument housing as in claim 8, wherein the second portion comprises a chamfered edge.

11. The instrument housing as in claim 8, wherein the second portion comprises a portion for receiving a fastener.

12. The instrument housing as in claim 8, wherein the first portion comprises a portion for receiving a fastener.

13. The instrument housing as in claim 8, wherein the third portion comprises a portion for receiving a fastener.

14. The instrument housing as in claim 8, wherein the second portion comprises a substantially rectangular box-like form.

15. An instrument housing comprising;
an instrument portion for receiving an instrument;
a wedge-like portion projecting from the instrument portion; and
the instrument portion and the wedge-like portion flexibly moveable with respect to each other so as to allow the housing to conform to a mounting surface.

16. The instrument housing as in claim 15, wherein the wedge-like portion comprises a chamfered edge.

17. The instrument housing as in claim 15, wherein the instrument portion comprises a chamfered edge.

18. The instrument housing as in claim 15, wherein the wedge-like portion comprises a portion for receiving a fastener.

19. The instrument housing as in claim 15, wherein the instrument portion comprises a portion for receiving a fastener.

20. The instrument housing as in claim 15, wherein the housing comprises a flexible plastic material.

* * * * *

UNITED STATES PATENT AND TRADEMARK OFFICE
Certificate

Patent No. 7,950,291 B2                                                   Patented: May 31, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Timothy A. Vogel, Independence, MO (US); and Jeffrey Scott Beneke, Peculiar, MO (US).

Signed and Sealed this Eleventh Day of October 2011.

*LISA CAPUTO*
*Supervisory Patent Examiner*
*Art Unit 2855*
*Technology Center 2800*